Oct. 2, 1945. H. E. McCALLION 2,385,999
EXPANDING REAMER
Filed Nov. 18, 1944
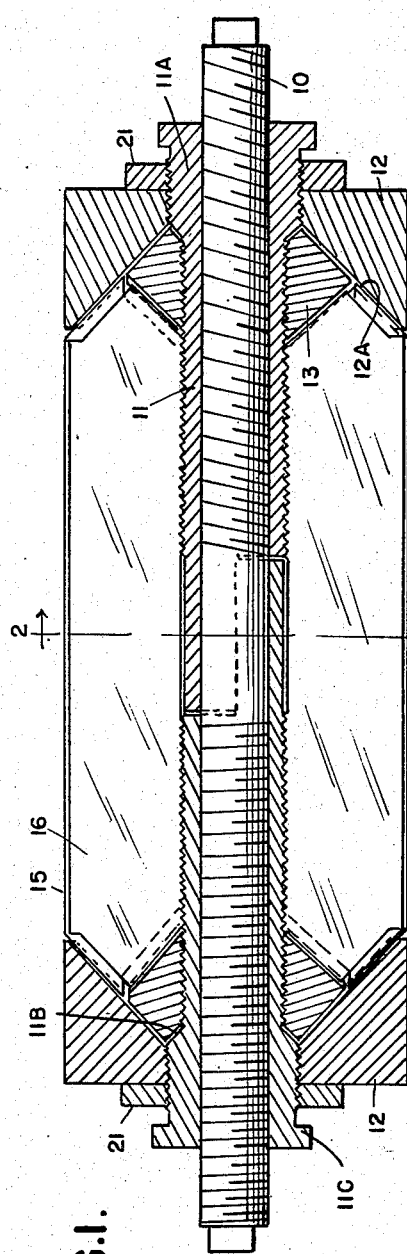
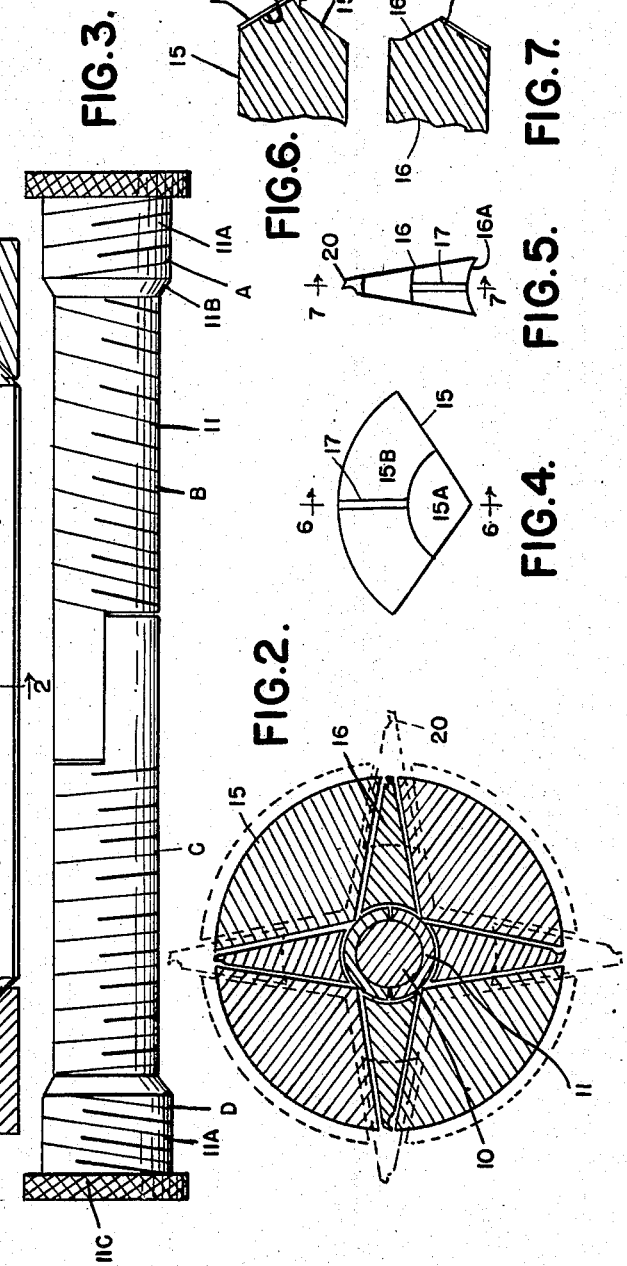
INVENTOR.
HUGH E. McCALLION
BY
Swan, Frye & Hardesty
ATTORNEYS Patented Oct. 2, 1945

2,385,999

UNITED STATES PATENT OFFICE 2,385,999

EXPANDING REAMER

Hugh E. McCallion, Roseville, Mich.

Application November 18, 1944, Serial No. 564,043

7 Claims. (Cl. 77—75)

The present invention relates to expanding reamers and has among its objects an expanding reamer capable of more rapid and accurate expansion and contraction than is possible with the conventional expanding reamer.

Another object is a reamer in which the blades are at all times and in any position provided with complete and rigid lateral support.

Other objects and advantages will readily occur to those skilled in the art upon reference to the following description and the accompanying drawing in which Fig. 1 is a longitudinal central section of a reamer embodying the present invention.

Fig. 2 is a section on line 2—2 of Fig. 1.

Fig. 3 is a view in elevation of one of the elements.

Figs. 4 and 5 are end views of the outer and inner wedges respectively.

Figs. 6 and 7 are part sections on the line 6—6 of Fig. 4 and the line 7—7 of Fig. 5 respectively.

In the drawing, the reamer is shown as assembled around a central shaft or rod 10 provided with oppositely threaded end portions upon which are threaded the two portions of the tubular member 11 shown in elevation in Fig. 3.

This element 11 is provided with a main smaller portion having enlargements 11A at its ends separated from the smaller portion by smooth angular shoulders 11B while at the extreme ends there may be provided further enlarged portions 11C, knurled or polygonal for convenience in handling.

As shown, the element 11 will be made in two portions having their adjacent ends interfitting to prevent relative rotation.

As stated above, element 11 is threaded on the rod 10 by means of suitable internal threads. It is also threaded externally as shown with the two portions of its smaller diameter oppositely threaded and the enlarged ends 11A also oppositely threaded and each of the latter is oppositely threaded with respect to its adjacent portion of the smaller diameter. In other words, the portion A will have a right hand thread, the portion B, a left hand thread, the portion C a right hand thread, and the portion D, a left hand thread.

Threaded upon the enlarged ends of the element 11 are two rings 12 whose outer or end faces are flat and normal to the reamer axis and whose inner faces 12A constitute re-entrant cones, and threaded upon the smaller portion of element 11 are two rings 13 of which the axially outward faces are provided with conical faces adapted to interfit with the faces 12A of rings 12 and with the inclined shoulders 11B of element 11. The axially inner faces of rings 13 are conical. The angles of the several cones are preferably 45°.

Located between these end rings and held thereby are a plurality of wedge elements, those designated by numeral 15 being referred to as "outer" wedges and those designated 16, as "inner" wedges.

In the preferred form as shown, the outer wedges 15 consist of bars having a cross sectional shape approximately that of a sector of a circle representing the reamer in its smallest adjustment, but while the curved outer surfaces of these wedges are arcs of such a circle, the side or flat faces are not radial but converge to include an angle greater than the arc of the outer surface. The apex thus produced, lies just outside the perimeter of element 11.

The inner wedges 16, as shown in Figure 5, have their inclined flat faces including a much smaller angle than do the flat faces of the outer wedges and since they lie between the outer wedges, the base of the triangular cross sectional area is near the element 11. This base 16A is, as shown, curved to conform to the curvature of element 11.

The ends of both outer and inner wedges are curved to abut and coact with the rings at the ends of the reamer.

Referring to Figures 4 to 7, it will be noted that wedge 15 is provided with two conic faces offset from each other. That is, on wedge 15, the lower or inner cone face 15A is set back a short distance from the upper or outer cone face 15B. It will be noted that both wedges are provided with ribs 17 adapted to coact with suitable channels in the cones of the end rings 12 and 13 to prevent relative rotation of rings and wedges.

Other means for preventing relative rotation may of course be used if desired.

As indicated best in Figures 2 and 5, the wedges 16 may be provided at their outer edges with cutting edges, as at 20, either integral or inserted.

In the position of the parts as in Figure 1, it will be noted that the inner wedges 16 are drawn in to provide the smallest diameter of the assembly and if it is desired so to do, the blades of wedges 16 may be within the perimeter and thus fully protected by the adjacent wedges 15.

When it is desired to expand the reamer, the lock nuts 21 are loosened and backed off a short distance, the element 11 held to prevent rotation and the rings and wedges rotated in the proper direction as a unit. This procedure causes the rings 13 to move toward each other and the rings 12 to move away from each other. Such movement of rings 13 causes a radial movement of wedges 16 and this radial movement expands the wedges 15.

It should be noted that when the parts are in the smallest diameter adjustment, the wedges 15 contact only the ring 12, not touching ring 13, and the wedges 16 contact only the ring 13 and do not touch ring 12.

In the largest diameter adjustment, wedges 15 and 16 both touch both rings, thus limiting the outward movement of the cutters. The range of adjustment is determined by the amount of displacement of the cone surfaces the one from the other on the ends of the wedges 15, in other words by the length of the line 30 in Figure 6.

In the foregoing description, use has been made of the term "cone" to describe the action surfaces of the rings 12 and 13, but it is not necessary that these be truly conic, as they may be pyramidal as there is no relative rotary movement between them and the ends of the wedges 15 and 16.

And, while the mechanism has been described and shown as a four bladed expansion reamer, a different number of blades, such as three, six, eight or other number may be used, and the mechanism may also be adapted for use as an expanding mandrel or for use as a clutch member and such uses are in contemplation.

In selecting the number and form of blades or inner wedges to be used, no particular apex angle for the wedges is necessarily chosen since they may vary widely. It will always be the case, however, that the sum of the apex angles of the outer wedges less the sum of the apex angles of the inner wedges will equal 360°.

Further, by using threads of a different pitch on the portions A and D of element 11 from those on portions B and C, the longitudinal movement of rings 12 and 13 may be made to accord with the outward movement of the two sets of wedges so that the latter will always contact their respective rings.

Now having described the invention and the preferred embodiments thereof, it is to be understood that said invention is to be limited, not to the specific details herein set forth, but only by the scope of the claims which follow:

I claim:

1. An expanding reamer having a central member threaded on its main portion with the threads toward one end opposite to those toward the other end, and having end portions also threaded with the threads of each said end portion opposite to the threads on the adjacent main portion, blade expanding rings threaded on the main portions, blades seated thereon, and blade supporting wedge members between said blades, said wedge members being adjustably held by the rings threaded on the end portions.

2. In an expanding reamer, wedge shaped blade carrying members, having small apex angles and having their bases near the reamer axis, wedge shaped filler members between the blade carrying members, said filler members having their apices adjacent the reamer axis, means for moving said blade carrying members radially, and means for retaining said filler members while allowing them to be moved outwardly by said blade carrying members.

3. In an expanding reamer, a central threaded member, a pair of axially movable oppositely placed cone members carried thereby, a second pair of axially movable oppositely placed cone members on said central member located beyond the first pair and having internal cones, said central member and cone members being so threaded that when the latter are rotated on said central member the cone members at either end move in opposite directions, longitudinal blade members having diagonal surfaces contacting the first pair of cone members, and longitudinal filler members between said blade members and having diagonal surfaces contacting the internal cones of the second pair of cone members and also having diagonal surfaces parallel with but displaced from the cones of the first pair of cone members.

4. In an expanding reamer, a central threaded member, a pair of axially movable oppositely placed cone members carried thereby, a second pair of axially movable oppositely placed cone members on said central member located beyond the first pair and having internal cones, said central member and cone members being so threaded that when the latter are rotated on said central member the cone members at either end move in opposite directions, longitudinal blade members having diagonal surfaces contacting the first pair of cone members, and longitudinal filler members between said blade members and having diagonal surfaces contacting the internal cones at the second pair of cone members and also having diagonal surfaces parallel with but displaced from the cones of the first pair of cone members, said cones and said contacting surfaces being provided with means to prevent relative movement when said cone members are rotated about said central member.

5. In an expanding reamer, a central threaded member, a pair of axially movable oppositely placed cone members carried thereby, a second pair of axially movable oppositely placed cone members on said central member located beyond the first pair and having internal cones, said central member and cone members being so threaded that when the latter are rotated on said central member the cone members at either end move in opposite directions, longitudinal blade members having diagonal surfaces contacting the first pair of cone members, and longitudinal filler members between said blade members and having diagonal surfaces contacting the internal cones of the second pair of cone members and also having diagonal surfaces parallel with but displaced from the cones of the first pair of cone members, said cones and said contacting surfaces being ribbed whereby to prevent relative movement when said cone members are rotated about said central member.

6. In an expanding reamer, wedge-shaped radially arranged blade carrying members having bases near the reamer axis, wedge shaped filler members between the blade carrying members, said filler members having their apices adjacent the reamer axis, means for moving radially the blade carrying members, and means for restraining the filler members while allowing them to be moved outward by said blade carrying members.

7. In an expanding reamer, inner and outer wedge shaped members alternately and radially arranged about the axis of said reamer, means for simultaneously moving radially said wedge shaped members, and means for retaining said members while being moved, the sum of the apex angles of the outer wedge shaped members minus the sum of the apex angles of the inner wedge shaped members equally 360°.

HUGH E. McCALLION.